Jan. 7, 1958 L. M. HUDSON ET AL 2,818,777
TRIPLET TYPE OBJECTIVE LENS
Filed June 25, 1956
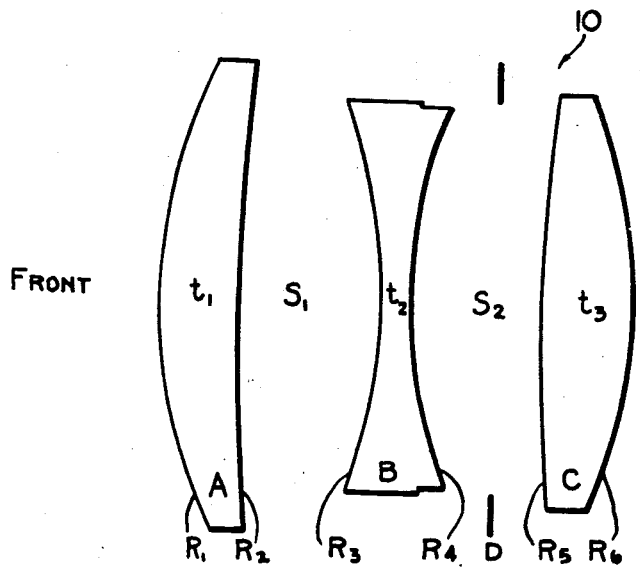
RELATIVE APERTURE = $f/2.8$
E.F. = 100 mm.
FIELD ANGLE = 46°
INVENTORS
LENA M. HUDSON
JOHN D. HAYES
ATTORNEY

United States Patent Office 2,818,777
Patented Jan. 7, 1958

2,818,777

TRIPLET TYPE OBJECTIVE LENS

Lena M. Hudson, Brighton, and John D. Hayes, Rochester, N. Y., assignors to Bausch & Lomb Optical Company, Rochester, N. Y., a corporation of New York Application June 25, 1956, Serial No. 593,669

3 Claims. (Cl. 88—57)

This invention relates to improvements in photographic objectives of the simple triplet type having a large relative aperture and large field angle.

It is an object of this invention to provide an improved simple triplet type of photographic objective or the like having a relative aperture of $f/2.8$ or more and a field angle of at least 46°, and wherein spherical and chromatic aberrations, coma, astigmatism and flatness of field are well corrected so that the objective is capable of superior performance.

Further objects and advantages will be found in the details of construction and the form and arrangement of parts by reference to the specification below and the accompanying drawing.

In the figure of the drawing, a photographic objective designated generally by the numeral 10 embodying our invention is illustrated. The objective 10 comprises three air spaced simple lenses which are designated A, B, and C respectively from front to rear, the A lens being of positive power and meniscus form, the B lens being of negative power and double concave form, and the C lens being of positive power and double convex form.

According to our invention, the achromatization of the objective 10 and the improvement of its monochromatic aberrations and flatness of field are achieved by using the constructional data as outlined herebelow in which F designates the equivalent focal length of the objective. The refractive lens surfaces $R_1$ to $R_6$ formed respectively on the lenses A, B and C are specified by the following mathematical relationships:

$$.35\,F < R_1 < .48\,F$$
$$4.0\,F < R_2 < 95.0\,F$$
$$.49\,F < -R_3 < .71\,F$$
$$.39\,F < R_4 < .48\,F$$
$$1.20\,F < R_5 < 4.96\,F$$
$$.35\,F < -R_6 < .58\,F$$

The thicknesses of the lenses A, B and C, designated by $t_1$, $t_2$ and $t_3$ respectively, are specified by the following mathematical relationships:

$$.055\,F < t_1 < .089\,F$$
$$.012\,F < t_2 < .030\,F$$
$$.049\,F < t_3 < .074\,F$$

The front air space $S_1$ and rear air space $S_2$ are specified by the mathematical relationships given herebelow:

$$.104\,F < S_1 < .130\,F$$
$$.078\,F < S_2 < .120\,F \text{ or } .75\,S_1 < S_2 < .92\,S_1$$

All of the values of refractive index $n_D$ for the lenses A, B and C lie within the range of 1.700 to 1.7600. The Abbe number or dispersion values $\nu$ of the lenses A and C are within the range of 45.0 to 50.0 and the dispersion of lens B has a value which is .570 to .675 of the average dispersion value of lenses A and C or between .286 and .339 times the sum of the dispersive values of lenses A and C.

It is important that the front air space $S_1$ in all forms of this invention, be from 8% to 25% greater than the rear air space $S_2$ since this feature strongly influences and is beneficial in achieving a high degree of correction of all of the image errors in an objective having a relative aperture as high as $f/2.8$ and a field angle of 46°. In all forms of this invention, the lens surface $R_2$ has minus power although the combination of $R_1$ and $R_2$ produces a net positive power and this feature is especially useful in achieving a good condition of coma. A diaphragm D is located in the rear air space $S_2$.

The numerical data for constructing three typical forms of photographic objectives according to our invention as outlined above is given in Tables I, II and III herebelow.

*Table I*

E. F.=100    $f/2.8$    Field angle=46°

| Lens | Radii | Thickness | Space | $n_D$ | $\nu$ |
|---|---|---|---|---|---|
| A | $R_1=43.09$<br>$R_2=3441.3$ | $t_1=6.06$ | $S_1=11.42$ | 1.700 | 48.0 |
| B | $R_3=-53.4$<br>$R_4=45.1$ | $t_2=1.61$ | $S_2=10.08$ | 1.720 | 29.3 |
| C | $R_5=292.5$<br>$R_6=-42.1$ | $t_3=5.85$ |  | 1.720 | 47.5 |

*Table II*

E. F.=100    $f/2.8$    Field angle=46°

| Lens | Radii | Thickness | Space | $n_D$ | $\nu$ |
|---|---|---|---|---|---|
| A | $R_1=44.58$<br>$R_2=2270.1$ | $t_1=6.08$ | $S_1=11.97$ | 1.720 | 47.5 |
| B | $R_3=-53.66$<br>$R_4=45.3$ | $t_2=1.616$ | $S_2=10.63$ | 1.720 | 29.3 |
| C | $R_5=293.9$<br>$R_6=-42.09$ | $t_3=5.88$ |  | 1.720 | 47.5 |

*Table III*

E. F.=100    $f/2.8$    Field angle=46°

| Lens | Radii | Thickness | Space | $n_D$ | $\nu$ |
|---|---|---|---|---|---|
| A | $R_1=40.7$<br>$R_2=490.4$ | $t_1=6.98$ | $S_1=11.48$ | 1.700 | 48.0 |
| B | $R_3=-64.4$<br>$R_4=41.3$ | $t_2=2.44$ | $S_2=10.18$ | 1.720 | 29.3 |
| C | $R_5=162.8$<br>$R_6=-48.5$ | $t_3=6.05$ |  | 1.720 | 47.5 |

One outstanding characteristic of all of the three forms of objectives specified in Tables I, II and III is the high refractive index of the glass from which all of the lens elements are made. In the form described in Table II, all of the lens elements are made of glass having the same refractive index of 1.720. The use of a high index glass of about 1.720 makes it possible to secure excellent correction of spherical and chromatic aberrations and astigmatism in the present objective having a relative aperture as large as $f/2.8$ and further achieves a good flatness of field for field angles as large as 46 degrees.

Although only certain forms of our invention have been shown and described in detail, other forms are possible and changes and substitutions may be made therein without departing from the spirit of the invention as defined in the claims herebelow.

We claim:
1. A photographic objective having a relative aperture of at least f/2.8 and a field angle of at least 46° and comprising a front and a rear positive lens between which an air spaced double concave lens is optically aligned, said objective being constructed according to the numerical data given in the table herebelow in which $R_1$ to $R_6$ designate the radii of the refractive surfaces of the lenses, starting at the front of the objective, $t_1$ to $t_3$ designate axial thicknesses of the respective lenses, $S_1$ and $S_2$ designate the axial spaces between the lenses, $n_D$ represents the index of refraction of the lens material for the D line of the spectrum and $\nu$ represents the dispersion of said lens material,

E. F. = 100

| Lens | Radii | Thickness | Space | $n_D$ | $\nu$ |
|---|---|---|---|---|---|
| A | $R_1$=43.09 | $t_1$=6.06 | | 1.700 | 48.0 |
| | $R_2$=3441.3 | | $S_1$=11.42 | | |
| B | $R_3$=−53.4 | $t_2$=1.61 | | 1.720 | 29.3 |
| | $R_4$=45.1 | | $S_2$=10.08 | | |
| C | $R_5$=292.5 | $t_3$=5.85 | | 1.720 | 47.5 |
| | $R_6$=−42.1 | | | | |

2. A photographic objective having a relative aperture of at least f/2.8 and a field angle of at least 46° and comprising a front and a rear positive lens between which an air spaced double concave lens is optically aligned, said objective being constructed according to the numerical data given in the table herebelow in which $R_1$ to $R_6$ designate the radii of the refractive surfaces of the lenses, starting at the front of the objective, $t_1$ to $t_3$ designate axial thicknesses of the respective lenses, $S_1$ and $S_2$ designate the axial spaces between the lenses, $n_D$ represents the index of refraction of the lens material for the D line of the spectrum and $\nu$ represents the dispersion of said lens material,

E. F. = 100

| Lens | Radii | Thickness | Space | $n_D$ | $\nu$ |
|---|---|---|---|---|---|
| A | $R_1$=44.58 | $t_1$=6.08 | | 1.720 | 47.5 |
| | $R_2$=2270.1 | | $S_1$=11.97 | | |
| B | $R_3$=−53.66 | $t_2$=1.616 | | 1.720 | 29.3 |
| | $R_4$=45.3 | | $S_2$=10.63 | | |
| C | $R_5$=293.9 | $t_3$=5.88 | | 1.720 | 47.5 |
| | $R_6$=−42.09 | | | | |

3. A photographic objective having a relative aperture of at least f/2.8 and a field angle of at least 46° and comprising a front and a rear positive lens between which an air spaced double concave lens is optically aligned, said objective being constructed according to the numerical data given in the table herebelow in which $R_1$ to $R_6$ designate the radii of the refractive surfaces of the lenses, starting at the front of the objective, $t_1$ to $t_3$ designate axial thicknesses of the respective lenses, $S_1$ and $S_2$ designate the axial spaces between the lenses, $n_D$ represents the index of refraction of the lens material for the D line of the spectrum and $\nu$ represents the dispersion of said lens material,

E. F. = 100

| Lens | Radii | Thickness | Space | $n_D$ | $\nu$ |
|---|---|---|---|---|---|
| A | $R_1$=40.7 | $t_1$=6.98 | | 1.700 | 48.0 |
| | $R_2$=490.4 | | $S_1$=11.48 | | |
| B | $R_3$=−64.4 | $t_2$=2.44 | | 1.720 | 29.3 |
| | $R_4$=41.3 | | $S_2$=10.18 | | |
| C | $R_5$=162.8 | $t_3$=6.05 | | 1.720 | 47.5 |
| | $R_6$=−48.5 | | | | |

References Cited in the file of this patent

UNITED STATES PATENTS

| 1,987,878 | Tronnier | Jan. 15, 1935 |
| 2,279,372 | Herzberger | Apr. 14, 1942 |
| 2,298,090 | Warmisham | Oct. 6, 1942 |
| 2,731,884 | Brendel | Jan. 24, 1956 |

FOREIGN PATENTS

| 532,950 | Great Britain | Feb. 4, 1941 |
| 612,757 | Great Britain | Nov. 17, 1948 |